US005087646A

United States Patent [19]

Tork et al.

[11] Patent Number: 5,087,646

[45] Date of Patent: Feb. 11, 1992

[54] FORMULATIONS AND PROCESS FOR DRESSING LEATHER AND COATING TEXTILES

[75] Inventors: Leo Tork, Leverkusen; Ludwig Rottmaier, Odenthal Gloebusch; Wolfgang Höhne, Bergisch Gladbach, all of Fed. Rep. of Germany

[73] Assignee: Bayer Aktiengesellschaft, Leverkusen, Fed. Rep. of Germany

[21] Appl. No.: 397,142

[22] Filed: Aug. 22, 1989

Related U.S. Application Data

[63] Continuation of Ser. No. 175,718, Mar. 31, 1988, abandoned.

[30] Foreign Application Priority Data

Apr. 4, 1987 [DE] Fed. Rep. of Germany ....... 3711415

[51] Int. Cl.$^5$ .................. C08K 3/20

[52] U.S. Cl. .................. 523/406; 523/409

[58] Field of Search .................. 523/406, 409

[56] References Cited

U.S. PATENT DOCUMENTS 4,581,395 4/1986 Nakaya et al. .................. 523/409

FOREIGN PATENT DOCUMENTS 0036639 9/1981 European Pat. Off. .

0226108 6/1987 European Pat. Off. .

*Primary Examiner*—Melvyn I. Marquis

*Attorney, Agent, or Firm*—Sprung Horn Kramer & Woods

[57] ABSTRACT

Aqueous formulations containing a copolymer of monoolefinically unsaturated monomers having an acid number of 5 to 150 mg of KOH/g of substance and/or a polyurethane having an acid number of 5 to 150 mg of KOH/g of substance as the binder and a triglycidyl isocyanurate having an epoxy value of 0.5 to 1.01 as the cross-linker are suitable for dressing fill grain, buffed or split leathers.

5 Claims, No Drawings

FORMULATIONS AND PROCESS FOR DRESSING LEATHER AND COATING TEXTILES

This is a continuation of application Ser. No. 175,718, filed Mar. 31, 1988, now abandoned.

In the dressing of full grain, buffed or split leathers, dressing agents comprising pigments, binders and further auxiliaries are applied to the surface of the leather, so that the pores of the leather become sealed at the surface. The binders used are in general alkali-digested casein solutions and aqueous copolymer dispersions. These copolymer dispersions are polyacrylate dispersions, dispersions of copolymers of vinyl acetate with acrylic esters and/or ethylene, synthetic rubber dispersions or polyurethane dispersions. The pigments used are of the inorganic and organic type, for example iron oxide, titanium dioxide, azo pigments and phthalocyanines. The aqueous dressing liquors need to have been adjusted to an alkaline pH, since the dyeing batches generally contain a certain amount of aqueous alkaline casein solution.

The leather-processing industry is demanding dressings having ever higher fastness properties. Ever higher standards are required in particular of the dry and wet flex resistances, the rub-through fasteness and the swelling resistance to water and solvents. To improve the physical fastness properties, reactive dressings have been successully carried out for some time by using polymer dispersions having reactive groups as binders and crosslinking them on the leather by means of suitable polyfunctional compounds. Owing to the low thermal resistance of leather, conventional crosslinking systems, such as those used for example in the textile printing, nonwovens and coatings sector (for example with melamine resins), are not suitable. Instead, the crosslinking systems which are suitable for dressing leather need to react in an alkaline medium at room temperature or slightly above.

Self-crosslinking polymer dispersions which contain two groups which react with each other, for example crosslinking component A: (meth)acrylic acid, crosslinking component B: acrolein, glycidylmethacrylate or dichlorotriazinylaminoethyl methacrylate, have not proven suitable for lack of storage stability of the polymer dispersions.

Of proven suitability, by contrast, is a process for dressing leather by treatment with an incompletely polymerized synthetic rubber latex which, in the course of the dressing, is reacted with oxides and/or hydroxides of divalent metals (cf. EP-B-29,170). However, this process is restricted to thick-layered dressings on highly absorbent leathers having a rough surface, such as split leather and highly buffed, unimpregnated grain-corrected box leathers. On full grain leather and grain-corrected box leathers which have been impregnated with acrylate dispersions the adhesion of the layer of dressing to the leather and the adhesion between the individual layers of dressing are insufficient since with this mechanism of crosslinking (salt formation) film formation takes place too rapidly. In addition, the dry and wet flex resistances are insufficient for use as shoe upper leather, since full grain leather and impregnated grain-corrected box leather are coated substantially thinner with less polymer binder and these fastness properties decrease with increasing binder quantity and layer thickness. Furthermore, leathers dressed as described in EP-B-29,170 are not resistant to yellowing at 160° C.

However, this requirement needs to be met by upper leather—in particular by white and pastel-coloured leathers—since this temperature occurs in the course of the moulding-on of shoe sole material made of PVC or polyurethane (PUR).

A further aqueous reactive dressing for leather comprises crosslinking carboxylated aqueous dispersions of polyacrylates, polybutadienes, polyurethanes and casein solutions with polyfunctional aziridine compounds. It is true that in this process the physical fastness properties are appreciably improved, but owing to the high reactivity of the aziridine derivatives the processing conditions need to be maintained extremely carefully even at room temperature, a requirement which is only difficult to comply with in practice.

If, for example, leather, as is customary for nappa leather, is subjected between two applications of finish to an intermediate hot press at elevated temperatures on continuous ironing machines, or if several days (for example a weekend) pass before the leather receives the next application of finish, then the upper coat of finish no longer adheres to the lower coat.

Adhesion problems also arise between polymer bottom coat and seasoning if nitrocellulose or acetobutyrate seasonings customarily used or non-reactive PUR coatings are not applied immediately after the last application of bottom coat.

It is particularly difficult to produce embossed leathers by this crosslinking system since the embossibility of the leathers decreases very quickly with the degree of crosslinking. To be embossible at all, the leathers must always be embossed in the same state of crosslinking immediately after the application of finish. Since these requirements are only difficult to meet in a leather factory, reproducibility of the embossing effect is nonexistent in practice.

A further reactive method practised in leather dressing relies on crosslinking carboxyl-containing polyacrylate dispersions with epoxides of the type "dian" [glycidyl ethers of 2,2-bis-(4-hydroxyphenyl)-propane].

In this process, however, crosslinking takes longer than three weeks. For this reasons, many fastness properties of importance for shoe manufacture are obtained too late, for example the hot-water swelling resistance for the thermosetting process, resistance to the solvents of the adhesives, and the tear initiation resistance.

It has now been found that covering coats on leather having particularly good properties important for the dressing of leather, such as sealing and hiding power, grain break and stretchiness, low-temperature flexibility, dry and wet rub fastnesses, light fastness and heat resistance, but in particular very good dry and wet flex resistances, very good adhesion to the leather and adhesion between the individual coats of finish, are obtained when the treatment of leather is carried out with aqueous formulations which contain as binders at least one carboxyl-containing polymer and if desired casein and as crosslinkers a specific 1,2-polyepoxide compound, and also pigments and further auxiliaries and additives.

The present invention thus provides aqueous formulations for dressing leather and for textile coating which are based on a carboxyl-containing polymer as binder and a 1,2-polyepoxide compound as crosslinker and which, if desired, also contain customary auxiliaries and additives, characterized in that the binder is a copolymer of monoolefinically unsaturated monomers having an acid number of 5–150 mg of KOH/g of substance and/or a polyurethane having an acid number of 5–150 mg of KOH/g of substance and in that the 1,2-polyepoxide compound is triglycidyl isocyanurate having an epoxy value of 0.5 to 1.01.

The aqueous formulation additionally contains optionally base-digested casein. The carboxyl groups can be present as free acid or as carboxylate groups. If the formulation contains base-digested casein, the polymer contains carboxylate groups.

The triglycidyl isocyanurate present in the aqueous formulations according to the invention conforms to the formula (I)

I

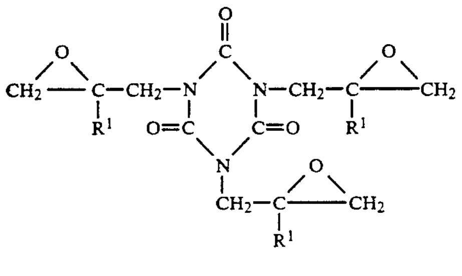

in which $R^1$ denotes hydrogen or methyl, preferably hydrogen.

The triglycidyl isocyanurate of the general formula (I) present in the formulations according to the invention is known and can be obtained by reacting cyanuric acid with excess epichlorohydrin or $\beta$-methylepichlorohydrin in the presence of a suitable catalyst, for example triethylamine, in a manner known per se at 20°-200° C. to give the trichlorohydrin isocyanurate and then treating with agents which eliminate hydrogen chloride, such as aqueous sodium hydroxide solution, at 20°-120° C.

The preparation of this triglycidyl isocyanurate is described in more detail for example in U.S. Pat. No. 3,337,509. If the three radicals $R^1$ are identical, two substances are obtained which are diastereomeric to each other. These compounds are then referred to as $\alpha$- or $\beta$-triglycidyl isocyanurate [cf. Angew. Chemie (1968) p. 851/2].

From the crude product the two isomers can be isolated by fractional crystallization from suitable solvents, for example methanol or dichloromethane. For use in industry as a crosslinker the triglycidyl isocyanurate can in general be used in the form of the crude product produced in the synthesis.

This crude product may well contain polyepoxide oligomers. A portion of the epoxy groups can have been hydrolysed, so that better solubility is obtained. However, the crude product should not contain fewer than two epoxy groups in the molecule since otherwise crosslinking is insufficient. The crude products generally have epoxy values of 0.5 to 1.01, preferably of 0.8 to 1.01.

The epoxy value indicates the number of 1,2-epoxy groups present in 100 g of substance. The epoxy equivalent is defined as the amount of substance in grams containing one equivalent of 1,2-epoxy groups. The determination is effected by titration with hydrochloric acid, one mole of 1,2-epoxy groups being equivalent to one mole of hydrogen halide.

The polyglycidyl compounds present in the aqueous formulations according to the invention can be used not only without solvent but also as solution and/or dispersion. Preferably, the polyepoxides are used, depending on their solubility in the particular medium used, in the form of a solution or dispersion.

Suitable solvents for this purpose are water and water-miscible organic solvents. Specific examples are: amides such as dimethylformamide, dimethylacetamide, N-methylpyrrolidone, alcohols such as methanol, ethanol, isopropanol, ethylene glycol monomethyl or monoethyl ether, ketones such as acetone, diacetone alcohol, esters such as glycol acetate or glycerol acetate. Preference is given to using dimethylformamide, N-methylpyrrolidone and diacetone alcohol.

It is of course also possible to use mixtures of triglycidyl isocyanurate with other polyglycidyl compounds, for example glycidyl ethers of bisphenols, glycidyl esters of di- or polycarboxylic acids, basic glycidyl compounds such as N,N-diglycidylcyclohexylamine or N,N-diglycidylbenzylamine or heterocyclic epoxides such as glycidylhydantoins or polyglycidyltriazolidine-3,5-diones.

The carboxyl-containing polymers present in the aqueous formulations according to the invention have an acid number of 5-150 mg of KOH/g of substance, their average molecular weight being 1,000 to 25,000. The OH numbers are preferably below 20, in particular below 10.

The carboxyl-containing polymers to be used according to the invention can be copolymers where one of the monomer components is an $\alpha,\beta$-ethylenically unsaturated carboxylic acid, or carboxyl-containing polyurethanes.

The carboxyl-containing copolymers should consist of 1-25% by weight of at least one copolymerizable $\alpha,\beta$-ethylenically unsaturated carboxylic acid having 3 to 5 C atoms and 75-99% by weight of at least one further copolymerizable monomer. The $\alpha,\beta$-ethylenically unsaturated carboxylic acids can be monocarboxylic acids or dicarboxylic acids or monoesters of dicarboxylic acids having 1 to 12 C atoms in the alcohol component.

Copolymerizable monomers are for example:

I) Esters of acrylic or methacrylic acids with aliphatic $C_1$–$C_{12}$-, cycloaliphatic $C_5$–$C_6$-, araliphatic $C_7$–$C_8$-monoalcohols, for example methyl acrylate, ethyl acrylate, n-propyl acrylate, isopropyl acrylate, n-butyl acrylate, tert-butyl acrylate, 2-methylhexyl acrylate, 2-ethylhexyl acrylate, dodecyl acrylate and the corresponding methacrylic esters and maleic diesters; cyclopentyl acrylate, cyclohexyl acrylate or the corresponding methacrylic esters and maleic diesters; benzyl acrylate, $\beta$-phenylethyl acrylate, corresponding methacrylic esters and maleic diesters;

II) Aromatic vinyl compounds, for example styrene, $\alpha$-methylstyrene, $\alpha$-methyl-p-isopropylstyrene, $\alpha$-methyl-m-isopropylstyrene, o- or p-chlorostyrene, o- or p-bromostyrene, ring-substituted methylstyrenes, p-tert-butylstyrene or mixtures thereof;

III) Vinyl esters of organic monocarboxylic acids, in which the acid component contains 2 to 4 C atoms, such as, for example, vinyl acetate and vinyl propionate;

IV) Monoolefinically unsaturated halohydrocarbons, such as vinyl chloride or vinylidene chloride, preferably vinyl chloride;

V) Acrylonitrile, methacrylonitrile, acrylamide methacrylamide, methylolacrylamide, methylolmethacrylamide, alkoxymethylacrylamide and alkoxymethylmethacrylamide having 1 to 4 carbon atoms in the alkoxy group;

VI) Butadiene, isoprene;

VII) Vinyl alkyl ethers having 1 to 4 C atoms in the alkyl group, such as vinyl methyl ether, vinyl ethyl ether, vinyl propyl ether;

VIII) N-Vinyl compounds, such as N-vinyl pyrrolidone, N-vinyl phthalimide.

Preferred carboxyl-containing copolymers consist of polymerized units of a) 0–70% by weight of butadiene, isoprene or mixtures thereof, preferably butadiene b) 0–40% by weight of acrylonitrile, methacrylonitrile, acrylamide, methacrylamide, methylolacrylamide, methylolmethacrylamide or mixtures thereof, preferably acrylonitrile and/or acrylamide c) 0–60% by weight of styrene, α-methylstyrene, o-or p-chlorostyrene, o- or p-bromostyrene, p-tert-butylstyrene or mixtures thereof, preferably styrene d) 0–99% by weight of acrylic esters with aliphatic $C_1$–$C_8$-alcohol radicals or methacrylic esters with aliphatic $C_1$–$C_8$-alcohol radicals or mixtures thereof, of which up to 7.5% by weight can be replaced by at least one hydroxyl-containing, olefinic, copolymerizable monomer, such as hydroxyalkyl esters of acrylic, methacrylic, maleic, fumaric or itaconic acid having 2 to 4 C atoms in the alkyl radical;

e) 0–20% by weight of vinyl acetate f) 1–25% by weight of acrylic acid, methacrylic acid, itaconic acid, maleic acid, fumaric acid, itaconic, maleic or fumaric monoesters having 1 to 8 C atoms in the alcohol component or mixtures thereof, preferably acrylic acid and/or methacrylic acid and/or itaconic acid, the sum of the percentages of a) to f) being 100.

The term copolymers is to be understood as meaning not only copolymers having a random distribution of the monomers present as copolymerized units, or block copolymers, but also graft copolymers where monomers have been grafted onto a preformed homopolymer or copolymer. Random copolymers are preferred.

The preparation of the carboxyl-containing copolymers to be used according to the invention is effected in known manner by substance, solution or dispersion polymerization, preferably by dispersion polymerization. The copolymers prepared in substance or solution polymerization need to be converted into a dispersion in a 2nd step. To prepare such stable dispersions, it is possible to use anionic, cationic or nonionic emulsifying and dispersing agents in an amount of 0.1 to 20% by weight, based on monomers. Methods of this type are described for example in "Methoden der organischen Chemie" [Methods of Organic Chemistry], Houben-Weyl, 4th edition, volume 14/1, pages 24–556 (1961) and in German Laid-Open Application D-OS 2,946,435.

The polymerizations can be carried out at temperatures of 0° C. to about 100° C.

The initiators used can be for example percarbonates, peresters such as tert-butyl perpivalate, tert-butyl peroctoate, benzoyl peroxide, o-methoxybenzoyl peroxide, dichlorobenzoyl peroxide, azobisisobutyrodinitrile in amounts of 0.5 to 3% by weight, based on the amount of monomer.

It is also possible for customary molecular weight regulants such as thioglycol, thioglycerol or tert-dodecyl-mercaptan to be present.

Carboxyl-containing polyurethanes are likewise known. The preparation of these polyurethanes or of aqueous dispersions thereof can be effected for example by dissolving prepolymers in organic solvents, such as, for example, acetone, adding and reacting with carboxyl-containing chain extenders, and dispersing in water. Since these systems are of the self-emulsifying type, no emulsifiers and only weak shearing forces are required. After the solvent has been removed by distillation, the polyurethane dispersions are left behind.

The carboxyl-containing chain extenders used are preferably hydroxycarboxylic acids and/or aminocarboxylic acids. It is important here, in particular in the case of hydroxycarboxylic acids, that no appreciable reaction take place between the carboxylic acids and the isocyanate. This can be achieved in particular by using sterically hindered hydroxycarboxylic acids, such as, for example, 2,2-di(hydroxymethyl)-propionic acid. Suitable chain extenders also include for example glycolic acid, lactic acid, tartaric acid, citric acid, glycin, α- or β-alanin, sarcosine, methionine, 4-aminobutyric acid, 6-aminocaproic acid, glutamic acid.

To prepare the prepolymers, isocyanates are reacted with hydroxyl-containing compounds such as hydroxyl-containing polyesters, polyethers or polycarbonates.

The isocyanates used for preparing the prepolymers are preferably the industrially readily accessible, for example aliphatic, cycloaliphatic or aromatic, diisocyanates or mixtures thereof, such as, for example, toluylene 2,4-diisocyanate, toluylene 2,6-diisocyanate, phenylene diisocyanate, methylene bis(4-phenylisocyanate); hexamethylene diisocyanate, cyclohexylene 1,4-diisocyanate, methylene bis(4-cyclohexyl)-isocyanate, isophorone diisocyanate.

The hydroxyl-containing polyesters used for preparing the prepolymers can be substituted by hydroxyl groups in the end position or in the main chain. Examples of such polyesters are those which are prepared by reaction of acids, esters, anhydrides or acid chlorides with glycols, polyglycols and, if desired, small amounts of triols. Suitable glycols and polyglycols are ethylene glycol diethylene and triethylene glycol, propylene glycol, 2,2-dimethyl-1,3-propanediol. Suitable triols are in particular glycerol, trimethylolpropane and trimethylolethane. These polyols are reacted with aliphatic, cycloaliphatic or aromatic dicarboxylic acids or derivatives thereof, such as phthalic, maleic, succinic, adipic, suberic, sebacic and hexahydrophthalic acid.

The hydrroxyl-containing polyethers used for preparing the prepolymers are preferably those which are prepared by reaction of aliphatic diols or triols, such as, for example, ethylene glycol, propylene glycol, glycerol or trimethylolpropane, or by reaction of bisphenols, such as, for example, bisphenol A, or hydroquinone with ethylene oxide or propylene oxide.

The preparation of these polyurethanes and of their aqueous dispersions is described inter alia in the following publications: German Published Application DAS 1,237,306, U.S. Pat. No. 3,479,310, GB 1,076,688.

The carboxyl-cotaining polymers to be used according to the invention preferably have an acid number of 10–100 mg of KOH/g of substance, in particular of 10 to 50 mg of KOH/g of substance.

Lower acid numbers within the stated range produce a reduced reactivity, which can result in a perfectly desirable slowing down ot the crosslinking reaction, and vice versa.

To prepare the formulations according to the invention, the water-dispersible polymers are preferably used in the form of their aqueous dispersions, in which the carboxyl groups should have advantageously been neutralized with amines such as triethylamine, triethanolamine, dimethylethanolamine or with ammonia.

The casein which is optionally to be used for preparing the formulations according to the invention is to be understood as meaning the commercially available, base-digested, i.e. water-solubilized, casein. The preparation of digested casein is described for example in "W. Grassmann, Handbuch der Gerbereichemie und Lederfabrikation I/1. Teil" [Handbook of Tanning Chemistry and Leathermaking I/1st. part], 2nd edition (1961), pages 724 et seq. In using base-digested casein, care must be taken to ensure that the carboxyl-containing polymers have been neutralized with amines. The casein solutions can contain the customary casein plasticizers such as glycols, polyols, polyether glycols.

The carboxyl-containing polymers and the triglycidyl isocyanurate are used in mixing ratios such that for every carboxyl group from 0.5 to 1.5, preferably from 0.9 to 1.1, epoxy groups are present.

The amount of hardener required depends very much on the nature of the polymer dispersion. A butadiene binder for example requires appreciably more crosslinker than an acrylate binder, while a strongly acid binder (for example itaconic acid) having a higher carboxylic acid content requires less than a weakly acid binder (for example methacrylic acid) having a smaller carboxylic acid content.

In the formulations according to the invention, it is possible to use catalysts of the type known from the reaction of epoxides with carboxylic acids to speed up the crosslinking reaction. Suitable catalysts are tertiary amines, for example triethylamine, quaternary ammonium salts, for example tetraethylammonium chloride, sulphides and sulphonium salts. Since, however, in general the carboxyl groups have been neutralized with amines, it is possible to dispense with an additional catalyst for the crosslinking reaction, so that the crosslinking on the leather surface or on the textile surface is preferably not catalyzed.

To the formulations according to the invention it is possible to add inorganic or organic pigments in their customarily effective amounts of up to 150% by weight, based on binder. Examples of pigments are: titania, iron oxides, carbon black, chromium oxide, phthalocyanine and azo pigments.

The formulations according to the invention can contain further auxiliaries and additives such as thickening agents, for example those on a cellulose basis such as carboxymethyl cellulose, polyvinyl alcohol or poly-n-vinylpyrrolidone.

The process according to the invention is suitable not only for leather bottom coatings and seasonings but also for textile coating. In the application of bottom coatings, commercially available pigment finish pastes are used in addition.

The processing can take place on full grain, buffed or split leathers or leather fibre materials of any kind. The dressings are applied to the leather in a manner known per se using the copolymers according to the invention, the crosslinker, the casein, pigment formulations of the abovementioned kind and further additives. The application of the dressings can be effected by casting, printing, knife-coating, spread-coating, spraying, buffing or plushing processes. The amount required depends on the nature and pretreatment of the leather and is readily determinable from preliminary experiments.

The bottom coating is carried out in one or more applications. Intermediate hot pressing or grain embossing at 70° to 110° C. serve to produce efficient melting and consequently good sealing of the bottom coat. This can be followed by the application of further coats of pigment finish.

The viscosity of the finishing liquors can be set to any desired value, depending on the type of leather and the application technique. Full grain leathers which are only to be given a thin coating are bottom-coated with low-viscosity liquors by means of air guns, while in the case of highly buffed leathers and split leathers the viscosity of the finishing compositions is raised with thickening agents to produce a better filling action. The finish is applied to this leather by means of airless guns or printing or casting machines.

A suitable final finish on the leathers dressed according to the invention comprises polyurethane one- and two-component lacquers, acetobutyrate lacquers, nitrocellulose lacquers and nitrocellulose lacquer emulsions of the oil-in-water and water-in-oil type.

The final finish can also comprise aqueous polyacrylate or polyurethane dispersions according to the invention, if desired together with casein solutions and crosslinking agents according to the invention, applied by spraying, printing and casting processes.

The advantages of the dressing process according to the invention can be summarized as follows:

The crosslinking reaction is slower than the crosslinking of carboxylated polymers with divalent metal oxides, for example zinc oxide, or with aziridine derivatives, but appreciably faster than reaction with epoxides of the type "dian". The crosslinking is complete after 5 to 15 days, depending on the type of polymer, amount and nature of acids present as polymerized units and amount of cross-linker used. Owing to this favourable crosslinking time, the process according to the invention, unlike the process described in EP-B-29,170, produces firm adhesion of the dressing layer not only on split and buffed leathers but also on full grain and acrylate binder impregnated grain-corrected box leathers.

A further result is an excellent interlayer adhesion even after an intermediate hot press and/or storage of the leathers for several days. Nor do any adhesion problems arise between the bottom coat and the seasoning, unlike crosslinking with aziridine compounds, it the seasonings applied comprise lacquers based on nitricellulose or acetobutyrate or non-reactive PUR lacquers.

From the point of view of application it is additionally important that the danger of overcrosslinking, as in the case of crosslinking with aziridine derivatives, due to erroneous dosage of crosslinker is much less likely and that, once the crosslinking reaction has come to an end, no posthardening, no coarsening of the grain break and no film embrittlement appear.

The low temperature strength of the dressing, the light fastness and the film transparency are not adversely affected by the crosslinking. The dry and wet flex resistance, the dry, wet and rub-through resistance and the solvent resistance values are very high and unobtainable from aqueous systems by other methods. It is also noteworthy that the known undesirable hydrophilicity of acrylate binders is appreciably reduced by the crosslinking.

Since very different carboxyl-containing polymers—polybutadienes, polyacrylates, PUR dispersions—can be used alone or in mixtures with each other or with casein as binders for the process according to the invention, the process has a remarkably wide range of uses. Using this process a very wide range of leathers can be dressed to a very high standard in respect of appearance and fastnesses.

For instance, to dress coloured and black split leathers it is advantageous to employ high-filling synthetic rubber latices which can have been completely or only partially polymerized, while to dress white and pastel-coloured split leathers intended for shoe uppers it is advantageous to employ acrylate and/or PUR dispersions which are light-fast and resistant to yellowing even at 160° C. Since, compared with the process described in EP-B-29,170, appreciably better dry and wet flex strengths are obtained, it is possible to add casein and inexpensive fillers such as talc, kaolin, chalk or diatomaceous earth, in higher quantities to improve the embossibility and to dry the dressing layer—to prevent adhesive bonding of the leather during ironing and in the stack—and also to improve the handle. The embossibility of the coated leather is still good even following several days of storage of the leather after the last application of finish. Fine embossed patterns do not disappear again when the leathers are stacked while still hot, as is not the case with the process described in EP-B-29,170.

The process according to the invention offers a particular advantage for the dressing of full grain and lightly buffed leathers which are not to appear coated, for example furniture and apparel nappa. The crosslinking according to the invention has the effect that the binder film can support major amounts of pigments, delustring and handle agents without significant loss of fastness. In consequence, high-pigment, low-binder finishing compositions can be used to cover flaws in thinner covering coats, thereby preserving the elegant grain break of the relatively thinly coated leather surface and, in addition, saving the dressing from a plastic-like appearance. In fewer operations than customary it is possible to dress leathers which, despite a thick coating, appear very natural and uncoated.

The Examples which follow illustrate the process according to the invention. The parts and percentages mentioned therein are always by weight.

EXAMPLE 1

To dress vegetable-retanned split leathers of buffed bag and upholstery leathers, 100 g of a pigment paste (aqueous dispersion containing 55% by weight of iron oxide pigment, 5% by weight of binder based on butyl acrylate, methyl methacrylate, N-vinylpyrrolidone acrylic acid or vinyl acetate copolymer, brought to pH 9-9.5 with $NH_3$) are stirred with 250 g of a commercially available 13.5% strength aqueous ammoniacal casein solution, 100 g of water and 25 g of a customary 60% strength aqueous peanut oil emulsion. To this mixture are added 500 g of the rubber latex described hereinafter, followed, for crosslinking, by 35 g of a 40% strength by weight dispersion of finely pulverulent triglycidyl isocyanurate (® ARALDITE PT 810 from Ciba-Geigy AG) in diacetone alcohol. At the end, the finishing liquor is adjusted with a suitable thickening agent to a viscosity which corresponds to an efflux time of 18-30 seconds from a Ford cup having a 4-mm nozzle.

The split or buffed bag and upholstery leathers to be treated receive 1 or 2 applications by means of brush, plushboard, airless gun, or spraying, printing or casting machine. The add-on level totals 150-300 g/m$^2$.

After drying, the leathers are ironed or grain-embossed at 100° C. and 300 bar with a delay of 2 to 5 seconds. This is followed by the application of the pigment finish top coat from the same liquor (add-on at 100-200 g/m$^2$). Finally, a customary nitrocellulose lacquer is applied as seasoning by casting.

The dressing obtained shows excellent values for the wet and dry flex resistances, good adhesion to the leather, good water-swelling resistance and a very good embossibility. Even very fine embossed patterns do not disappear again when the hot leathers are stacked.

The rubber latex was prepared in the following way:

In a 40-l stainless steel autoclave equipped with a cross-bar stirrer, a mixture of 18,000 g of water, 5,000 g of 1,3-butadiene, 3,000 g of acrylonitrile, 1,700 g of styrene, 333 g of 90% strength methacrylic acid and 50 g of tert-dodecylmercaptan is polymerized in the presence of 200 g of a sodium sulphonate of a mixture of long-chain paraffin hydrocarbons having an average chain length of 15 carbon atoms as emulsifier and 5 g of 70% strength tert-butyl hydroperoxide and 2.5 g of sodium formaldehydesulphoxylate dihydrate as redox initiator system, at 35° C., until a solids concentration of 20% is reached. Thereafter a solution of 100 g of a reaction product of isononylphenol with 20 moles of ethylene oxide and 2.5 g of sodium formaldehydesulphoxylate dihydrate in 500 g of water is injected, and polymerization is continued at 35° C. When the solids concentration has increased to about 31% by weight (a conversion of about 86%), the polymerization is stopped with a solution of 200 g of 25% strength by weight of diethylhydroxylamine in 200 g of water. The latex obtained is freed from residual monomers and has a solids concentration of 31%. The acid number of the binder is 19.5 mg of KOH/g of solids.

EXAMPLE 2

To dress synthetically retanned white split or buffed bag and upholstery leathers, 150 g of a white pigment paste (aqueous dispersion containing 65% of titania pigment, 5% by weight of binder based on an ethyl acrylate, methyl methacrylate, N-vinylpyrrolidone, acrylic acid or vinyl acetate copolymer, brought to pH 9-9.5 with $NH_3$) are stirred with 250 g of water, 10 g of 25% strength ammonia solution and 25 g of a customary 60% strength peanut oil emulsion. To this mixture are added with stirring 170 g of a 40% strength by weight carboxylated polyacrylate binder having a Shore A film hardness of 25° and an acid number of 24.2 (40% by weight of butyl acrylate, 43.5% by weight of ethylacrylate, 10% by weight of acrylonitrile, 2% by weight of acrylamide, 2% by weight of acrylic acid, 2% by weight of itaconic acid and 0.5% by weight of N-methylolacrylamide) and 330 g of a 40% strength by weight carboxyl-containing aliphatic polyurethane ester dispersion having a Shore A film hardness of 60° and an acid number of 36.8 (from a polyester of hexanediol, dimethylolpropionic acid and adipic acid, reacted with dicyclohexylmethane diisocyanate and crosslinked with diethylenetriamine, contains 8.8% of dimethylolpropionic acid based on solids) and, as counterion, triethylammonium, followed, for crosslinking, by 42 g of a 33.3% strength by weight solution of triglycidyl isocyanurate in N,N-dimethylformamide. Finally, the finishing liquor is adjusted with a suitable thickening agent to a viscosity which corresponds to an efflux time of 18 to 30 seconds from a Ford cup having a 4-mm nozzle.

The application properties of the dressing correspond to the advantageous properties described in the general section. The dressing is light-fast and resistant to yellowing even at 160° C.

EXAMPLE 3

100 g of a carbon black paste (aqueous dispersion containing 16% by weight of carbon black and 20% of a binder based on an isopropyl acrylate, methyl methacrylate, N-vinylpyrrolidone, acrylic acid or vinyl acetate copolymer, adjusted to pH 10-10.5 with aminoethanol) are thoroughly mixed with 60 g of an ammoniacal 13.5% strength by weight casein solution and with 30 g of a delustring paste containing 30% by weight of precipitated silica and 5% by weight of binder of the pigment paste of Example 1, and the mixture is diluted with 400 g of water.

Thereafter 250 g of a 40% strength by weight, aqueous dispersion of an acrylate-based copolymer having a Shore A film hardness of 45° and an acid number of 24.2 (71% by weight of butylacrylate, 23% by weight of acrylonitrile, 1.5% by weight of acrylamide, 0.5% by weight of N-methylolacrylamide, 2% by weight of acrylic acid and 2% by weight of itaconic acid) and 150 g of a 35% strength by weight, aqueous dispersion of a butadiene-based copolymer having a Shore A film hardness of 63° and an acid number of 25.9 (45% by weight of butadiene, 16% by weight of styrene, 28% by weight of acrylonitrile, 6% by weight of methacrylamide, 2% by weight of methacrylic acid and 3% by weight of itaconic acid) are added. Finally, to effect crosslinking, 22 g of a 25% strength by weight solution of triglycidyl isocyanurate in N-methylpyrrolidone are stirred in. Thorough mixing produces a high-hiding black binder colour which is particularly highly suitable for dressing buffed leathers. If the colour is applied by means of an airspray gun, the colour is used in the present form; if the colour is to be applied by plushing, the liquor of the colour finish is first diluted with water in a ratio of 2:1; while if the colour is to be applied by means of a casting machine or an airless gun, the liquor is adjusted with a suitable thickening agent to a viscosity which corresponds to an efflux time of 16 to 28 seconds from a Ford cup having a 4-mm nozzle.

The dressing obtained has not only a good appearance but also very good dry and wet flex resistances and also a good interlayer adhesion and water-swelling resistance.

We claim:

1. In an aqueous formulation for dressing leather and for textile coating comprising a carboxyl-containing polymer as binder and a 1,2-polyepoxide compound as crosslinker, the improvement wherein the binder is a copolymer of monoolefinically unsaturated monomers having an acid number of 5 to 150 mg of KOH/g of substance and the 1,2-polyepoxide compound is a triglycidyl isocyanurate having an epoxy value of 0.5 to 1.01.

2. An aqueous formulation according to claim 1, wherein the copolymer consists of polymerized units of a) 0-70% by weight of butadiene, isoprene of mixtures thereof, b) 0-40% by weight of acrylonitrile, methacrylonitrile, acrylamide, methacrylamide, methylolacrylamide, methylolmethacrylamide or mixtures thereof, c) 0-60% by weight of styrene, α-methylstyrene, o- or p-chlorostyrene, o- or p-bromostyrene, p-tert-butyl styrene or mixtures thereof, d) 0-99% by weight of acrylic esters with aliphatic $C_1$-$C_8$-alcohol radicals or mixtures thereof, e) 0-20% by weight of vinyl acetate, f) 1-25% by weight of acrylic acid, methacrylic acid, itaconic acid, maleic acid, fumaric acid, itaconic, maleic or fumaric monoesters having 1 to 8 C atoms in the alcohol component or mixtures thereof, the sum of the percentages of a) to f) being 100.

3. An aqueous formulation according to claim 1, wherein the crosslinker is a triglycidyl isocyanurate of the formula (I)

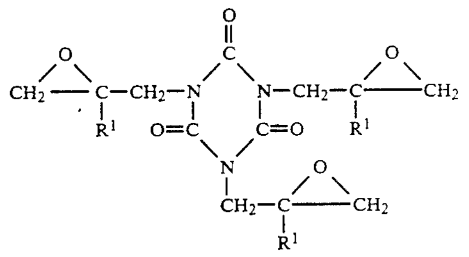

I in which $R^1$ denotes hydrogen or methyl.

4. An aqueous formulation according to claim 1, which further contains base-digested casein.

5. An aqueous formulation according to claim 1, which further contains customary auxiliaries and additives.

* * * * *